Aug. 6, 1929.  E. T. JONES  1,723,175
MASTER CONNECTING ROD FOR RADIAL CYLINDER ENGINES
Filed Oct. 31, 1927
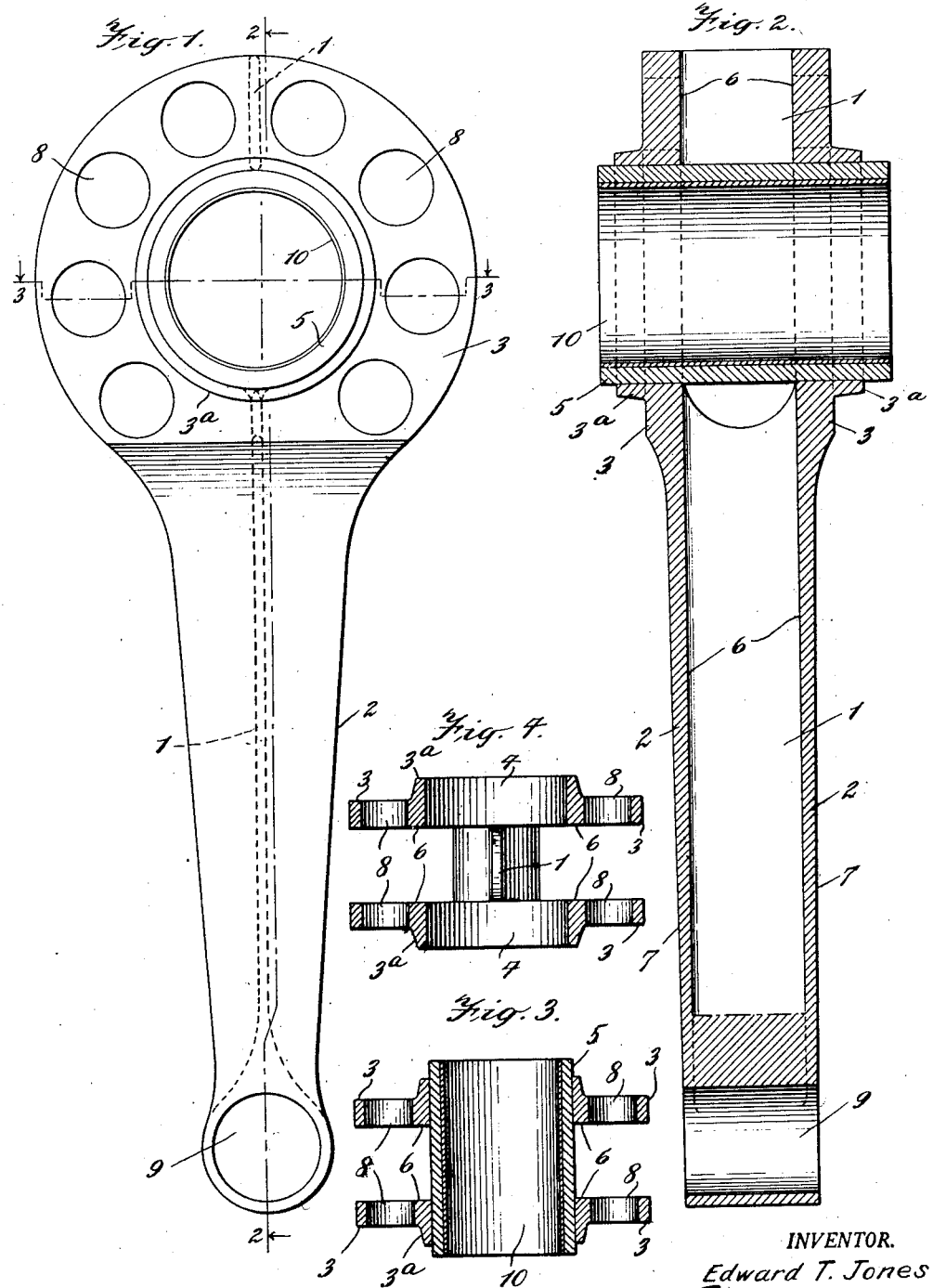
INVENTOR.
Edward T. Jones
BY
ATTORNEY Patented Aug. 6, 1929.

1,723,175

UNITED STATES PATENT OFFICE.

EDWARD T. JONES, OF RIDGEWOOD, NEW JERSEY, ASSIGNOR TO WRIGHT AERONAUTICAL CORPORATION, A CORPORATION OF NEW YORK.

MASTER CONNECTING ROD FOR RADIAL-CYLINDER ENGINES.

Application filed October 31, 1927. Serial No. 229,911.

This invention relates to connecting rods for internal combustion engines and particularly to master connecting rods for multiple radial cylinder combustion engines.

The construction of radial combustion engines presents the problem of connecting several pistons operating in separate cylinders to a common connecting rod bearing in a manner which will permit the forces acting upon the pistons to be transmitted to the common connecting rod bearing. Various mechanisms have been developed which successfully accomplish this purpose. Of these various mechanisms the one most commonly employed consists of a master connecting rod having a member surrounding a crankpin journal and forming a bearing thereon and a rigid extension or shank connected to one of the pistons through a wrist pin. Secondary rods from the other cylinders of the engine are connected to the bearing portion of the master rod by means of pins passing through a suitable opening in the ends of the auxiliary rods and through two flanged portions of the bearing portion of the master rod. In this type of construction the master rod of necessity takes a highly complicated form and requires numerous difficult machining operations.

It is the purpose of this invention therefore to simplify the structure of the master rod to minimize the machining operations both as to number and as to complexity thereby reducing the total cost of the rod.

To accomplish this result I construct the rod in two sections or members, a bearing rod section or member and a rod section or member, which sections or members may be shrunk or otherwise rigidly fastened together. The rod section is composed of an I member the plane of the web of which is parallel to the axis of the crank shaft bearing and the flanges of which are enlarged at one end and formed with opposed bearing openings therein to receive a cylindrical bearing member. The web portion may be cut away entirely at the bearing end or may be interrupted where the bearing member projects therethrough. This structure leaves the channels between the flanges of the I member continuous throughout substantially the entire length of the rod. The enlarged portions of the flanges at the bearing or crank end of the rod form in effect two spaced annular plates substantially disconnected so as to provide no backing or support for the bearing member. In accordance with my invention, the bearing member is so proportioned as to require no support between the inner faces of these side plates or enlarged flange portions. The pins for securing the auxiliary rods pass through these side plates around the bearing for the crank shaft. These features permit the removal of substantially all the metal between the flanges and so simplifies the machining of that portion of the rod member lying between these flanges.

A more complete understanding will be had from the following description taken in connection with the drawings in which:

Fig. 1 is a side elevation of a rod constructed in accordance with this invention;

Fig. 2 is a section on line 2—2 of Fig. 1;

Fig. 3 is a section on line 3—3 of Fig. 1, and

Fig. 4 is a section similar to Fig. 3 with the bearing removed.

In the illustrated embodiment of my invention the complete rod is composed of two parts, a rod section and a bearing section. The rod section comprises an I member having a web 1 bounded by two flanges 2 which are thickened and widened at one end as at 3 where they are bored to provide two opposed and aligned bearing openings 4 into which the bearing section 5 may be secured. Immediately surrounding the bearing openings the flanges may be provided with a raised boss 3ª to give a larger contacting and gripping surface for the bearing member. The web 1 is parallel to the axes of the bearing openings and substantially bisects the same, and is cut away adjacent the larger end to make an opening permitting the bearing member or sleeve 5 to extend through the two openings 4 in the enlarged ends 3 of the flanges 2. The inner surface 6 of each flange 2 on each side of web 1 lies for all practical purposes in a single plane and extends substantially the entire length of the rod, thus leaving the channelways between the two flanges 2 continuous and uninterrupted throughout substantially the entire length of the rod. The two outer surfaces 7 of each flange 2 also lie in a single plane from adjacent one end to the thickened portion 3 of the enlarged end. The enlarged portions 3 of the flanges 2 are formed with additional opposed and aligned apertures 8 arranged radially around the shaft bearing openings and constitute the point of connection of the link rods (not shown) to the master rod. The smaller end of the rod is provided with the usual wrist pin bearing opening 9 for attachment to the piston of the engine.

The bearing section comprises a sleeve or cylindrical section 5 of proper outer diameter to fit within the openings 4 and to be rigidly secured thereto by shrinking or by other suitable means. A bushing 10 may also be provided if so desired having a press fit into the bearing member and serving as a bearing surface for the crank shaft.

By constructing the rod of two parts and arranging the I member as previously described, the finishing operations are greatly simplified and reduced in number. It can readily be seen that by taking a single finishing cut upon each outer surface 7 of the flanges 2 from the small end to the enlarged portion 3 this much of these outer surfaces may be finished in one operation for each side. A single milling cutter may be run down the channelway continuously from the small end of the rod to the larger end thus finishing the inner surfaces 6 and the surface of the web 1 in one operation for each side, or the lower section of the web may be cut out entirely, in which case the milling cutter may be run down the channelway on one side, around the large end and up the other channel thus finishing the two channelways and flanges in one operation. The outer surfaces of the enlarged end of the flanges may be finished in the usual manner by one or two simple operations. The boring may be performed at any desired time either before or after the finishing operations, preferably before, however, as then all burrs are removed by the finishing cuts.

The bearing section being a simple cylindrical member is readily finished in an obvious manner after which it may be fitted into the rod section and secured therein by shrinking or by any other desired manner thus completing the rod.

It is obvious that a rod of this type may be used upon any multiple cylinder radial engine and that slight changes may be made in the details of design without departing from the spirit and scope of the invention as defined in the appended claims.

I claim:

1. A master connecting rod for radial cylinder engines comprising a rod member and a separate bearing member for the crank end thereof, the shank of the rod member being I-shape in cross-section and the crank end being formed of two spaced annular plates constituting continuations of the shank flanges, the bearing member extending between and being supported by the annular plates and being substantially unsupported between the plates.

2. A master connecting rod for radial cylinder engines comprising a rod member and a separate bearing member for the crank end thereof, the shank of the rod member being I-shape in cross-section and the crank end being formed of two spaced annular plates constituting enlarged continuations of the shank flanges, the bearing member extending between and being supported by the annular plates and being substantially unsupported between the plates, the spacing of the plates being such as to accommodate the ends of auxiliary connecting rods between them and the plates having apertures for the bearing pins for the said auxiliary rods about said separate bearing member.

3. A master connecting rod for radial cylinder engines comprising a rod member and a separate bearing member for the crank end thereof, the shank of the rod member being I-shape in cross-section and the crank end being formed of two spaced annular plates constituting enlarged continuations of the shank flanges, the bearing member extending between and being supported by the annular plates with its axis substantially in the plane of the web of said shank and being substantially unsupported between the plates, the spacing of the plates being such as to accommodate the ends of auxiliary connecting rods between them and the plates having apertures for the bearing pins for the said auxiliary rods about said separate bearing member.

4. A master connecting rod for radial cylinder engines comprising a rod member and a separate bearing member for the crank end thereof, the shank of the rod member being I-shape in cross-section and the crank end being formed of two spaced annular plates constituting continuations of the shank flanges with their inner surfaces in substantially the same planes as those of the respective flanges, the bearing member extending between and being supported by the annular plates and being substantially unsupported between the plates.

5. A master connecting rod for radial cylinder engines comprising a rod member and a separate bearing member for the crank end thereof, the shank of the rod member being I-shape in cross-section and the crank end being formed of two spaced annular plates constituting enlarged continuations of the shank flanges with their inner surfaces in substantially the same planes as those of the respective flanges, the bearing member extending between and being supported by the annular plates with its axis substantially in the plane of the web of said shank and being substantially unsupported between the plates, the spacing of the plates being such as to accommodate the ends of auxiliary connecting rods between them and the plates having apertures for the bearing pins for the said auxiliary rods about said separate bearing member.

In witness whereof, I hereunto subscribe my signature.

EDWARD T. JONES.